United States Patent [19]

Bentley

[11] 4,285,422
[45] Aug. 25, 1981

[54] CENTRIFUGALLY OPERATED CLUTCH AND VARIABLE RATIO TORQUE MULTIPLIER

[76] Inventor: Arthur P. Bentley, P.O. Box 1952, Roswell, N. Mex. 88201

[21] Appl. No.: 51,535

[22] Filed: Jun. 25, 1979

[51] Int. Cl.³ ............................................. F16D 23/00
[52] U.S. Cl. ................................................. 192/105 B
[58] Field of Search ............ 192/105 B, 38, 45, 53 R, 192/103 A, 103 B

[56] References Cited

U.S. PATENT DOCUMENTS

| 1,994,588 | 3/1935 | Nakashian | 192/105 B |
| 2,925,161 | 2/1960 | Euler | 192/105 B |
| 3,762,519 | 10/1973 | Bentley | 192/105 B |

FOREIGN PATENT DOCUMENTS 551378  2/1943  United Kingdom ................ 192/105 B Primary Examiner—Peter P. Nerbun
Attorney, Agent, or Firm—Herbert E. Haynes, Jr.

[57] ABSTRACT

A clutch and variable ratio torque multiplier having an input shaft upon which a housing having a power output device is coaxially journaled A plurality of balls carried in a disc are rotatably driven by the input shaft and are free to move radially due to centrifugal force, with such rotational and radial movement of the balls taking place in an opposed pair of special axially biased races that are carried in the housing for rotation therewith. At idle RPM of the input shaft, the balls roll freely in the races and zero rotational output of the housing results, and as shaft RPM increases, centrifugal force moves the balls radially and frictional engagement of the balls and the races increases for rotatably driving the housing at ratios which vary with the input shaft RPM. As the ratio approaches 1:1, the races engage friction clutches to lock the housing to the shaft to prevent slippage at higher RPM. In this manner, the device will smoothly and quietly shift from zero rotational output to direct drive as the RPM of the input shaft is increased.

9 Claims, 9 Drawing Figures

CENTRIFUGALLY OPERATED CLUTCH AND VARIABLE RATIO TORQUE MULTIPLIER

BACKGROUND OF THE INVENTION

1. Field of the Invention

This invention relates to clutch and torque multiplier devices and more particularly to a centrifugally operated clutch and variable ratio torque multiplier.

2. Description of the Prior Art

At the present time, there are many known clutches and torque multipliers which are employed primarily as transmission devices for vehicular driving purposes, and some of these devices employ steel balls which are moved radially to vary the ratio between the driving and driven elements of the device. In general, devices of this type employ mechanical mechanisms to move the balls radially, and these devices are therefore relatively complex and can cause considerable maintenance and repair problems.

To the best of my knowledge, only one clutch and variable ratio torque multiplier device has been devised which employs steel balls that are moved radially under the influence of centrifugal force to vary the ratio between the driving member and the driven member. This device, which is fully disclosed in U.S. Pat. No. 3,762,519, issued on Oct. 2, 1973 to the same inventor, comprises a drive member that includes a ball carrying disc which is axially movable on and is rotatably driven by the input shaft, and a driven member which includes a housing having a power takeoff device thereon, with the housing coaxially journaled for rotation about the input shaft. The housing has an inner chamber which is conical at one end and which is joined at its wider end by a cylindrical surface. A plurality of axially staggered recesses are formed in the cylindrical surface immediately adjacent the conical surface. The ball carrying disc is spring loaded toward the conical surface and the balls roll freely thereon at idle speeds of the input shaft which results in zero rotational driving of the housing. As the input shaft speed is increased, centrifugal force moves the balls radially which increases frictional engagement between the balls and the conical surface, thus resulting in rotational driving of the housing. This same increase in RPM of the input shaft will cause the disc to move away from the conical surface due to interaction of the balls and the conical surface. Thus, at intermediate and higher speeds of the input shaft, the balls will leave the conical surface and enter onto the cylindrical surface where they engage the recesses with hammer-like impacts. At the end of the cylindrical surface which is remote from the conical surface, a disc clutch is provided which effectively locks the driving ball carrying disc member to the driven housing at high speed to eliminate slippage therebetween.

This particular prior art clutch and torque multiplier has proven to be a very reliable and virtually trouble free device and has only one drawback, which is that at intermediate input shaft RPM, i.e., between the speed at which the balls move onto the cylindrical surface and maximum speeds where the disc clutch locks the drive and driven members together, the device produces a relatively loud clicking or chattering noise. This clicking or chattering noise which results from the hammer-like impacting of the balls with the axial recesses, is annoying and irritating to some people, and has caused some people to express conern over the proper operation of the device.

Therefore, it is desirable to provide a new and improved centrifugally operated clutch and variable ratio torque multiplier which overcomes some of the drawbacks of the prior art.

SUMMARY OF THE INVENTION

In accordance with the present invention, a new and improved centrifugally operated clutch and variable ratio torque multiplier mechanism is disclosed which smoothly and quietly shifts in a stepless manner between zero rotational output to direct drive as the RPM of the input shaft is increased from idle to maximum RPM.

The mechanism comprises a driving assembly and a driven assembly, with the driving assembly including a disc fixedly mounted on the input shaft of the mechanism for rotation therewith. The disc carries a plurality of balls on its periphery so that they rotate with the disc and are free to move radially under the influence of centrifugal force. The driven assembly of the mechanism includes a housing having a power output device thereon, with the housing journaled for rotation about the input shaft. A pair of ring-shaped races are mounted in the housing so as to be coaxial with the ball carrying disc, and the races are fast for rotation with the housing. The races are axially movable and are biased so as to engage opposite sides of the balls and form an annular groove in which the balls rotatingly and radially move.

When the input shaft of the mechanism is being rotated at low, or idle speed, the balls roll freely in the annular groove formed by the races which results in zero rotation of the housing. When the rotational speed of the input shaft is increased, the balls will move radially due to centrifugal force and will spread the races against the axial biasing thereof and the resulting friction between the races and the balls rotatingly drives the housing.

The annular groove formed by the races is provided with a diametrically opposed pair of cam surfaces which protrude into the path of the balls and form restrictions which limit ball slippage in the annular groove with the restrictions having increasing effect on ball movement as the speed of the input shaft is increased.

The clutch and variable ratio torque multiplier may also be provided with friction clutches which lock the housing to the input shaft to achieve a ratio of 1:1, with these clutches being operated by the spreading movement of the races when the input shaft is being driven at or near maximum speed.

Accordingly, it is an object of the present invention to provide a new and improved centrifugally operated clutch and variable ratio torque multiplier.

Another object of the present invention is to provide a new and improved centrifugally operated clutch and variable ratio torque multiplier which smoothly and quietly shifts from zero rotational output through variable ratios to direct drive as the speed of the rotational input is increased.

Another object of the present invention is to provide a new and improved centrifugally operated clutch and variable ratio torque multiplier which includes an input shaft upon which a housing having a power output means thereon is coaxially journaled. Rotational driving of the input shaft is coupled in variable ratios to the housing by a disc mounted on the input shaft, with the disc having a plurality of radially movable balls which rotate and move radially between a pair of axially biased races carried in the housing.

Another object of the present invention is to provide a new and improved centrifugally operated clutch and variable ratio torque multiplier of the above described character in which the races are configured to cooperatively form an annular groove in which the balls freely roll at idle RPM of the input shaft, with such free rolling resulting in zero rotational output of the housing.

Another object of the present invention is to provide a new and improved centrifugally operated clutch and variable ratio torque multiplier of the above described character in which increases of input shaft RPM above idle speed causes the balls to move radially in the annular groove to spread the races against the axial biasing thereof which increases the frictional engagement between the balls and the races to produce rotational driving of the housing.

Another object of the present invention is to provide a new and improved centrifugally operated clutch and variable ratio torque multiplier of the above described character in which the annular groove formed by the races is provided with a diametrically opposed pair of inwardly projecting cam surfaces which form restrictions in the annular groove with the surfaces configured to increasingly effect slippage as the speed of the input shaft increases.

Another object of the present invention is to provide a new and improved centrifugally operated clutch and variable ratio torque multiplier of the above described character in which the spreading action of the races due to radial movement of the balls will move the races axially into engagement with friction clutches which lock the housing to the input shaft at high RPM thereof to achieve a ratio of 1:1.

The foregoing and other objects of the present invention as well as the invention itself may be more fully understood from the following description when read in conjunction with the accompanying drawings.

DESCRIPTION OF THE PREFERRED EMBODIMENT

Figure 1:
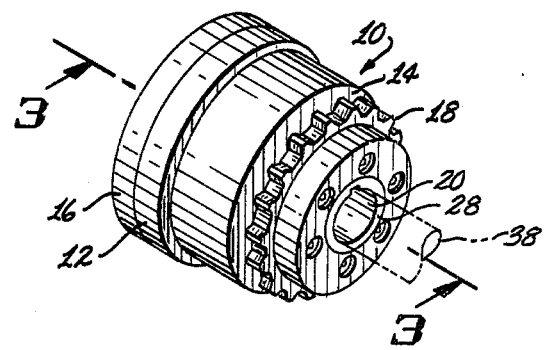
FIG. 1 is an isometric view of the centrifugally operated clutch and variable ratio torque multiplier of the present invention.

Referring more particularly to the drawings, FIG. 1 illustrates the centrifugally operated clutch and variable ratio torque multiplier of the present invention which is indicated in its entirety by the reference numeral 10.

Figure 2:
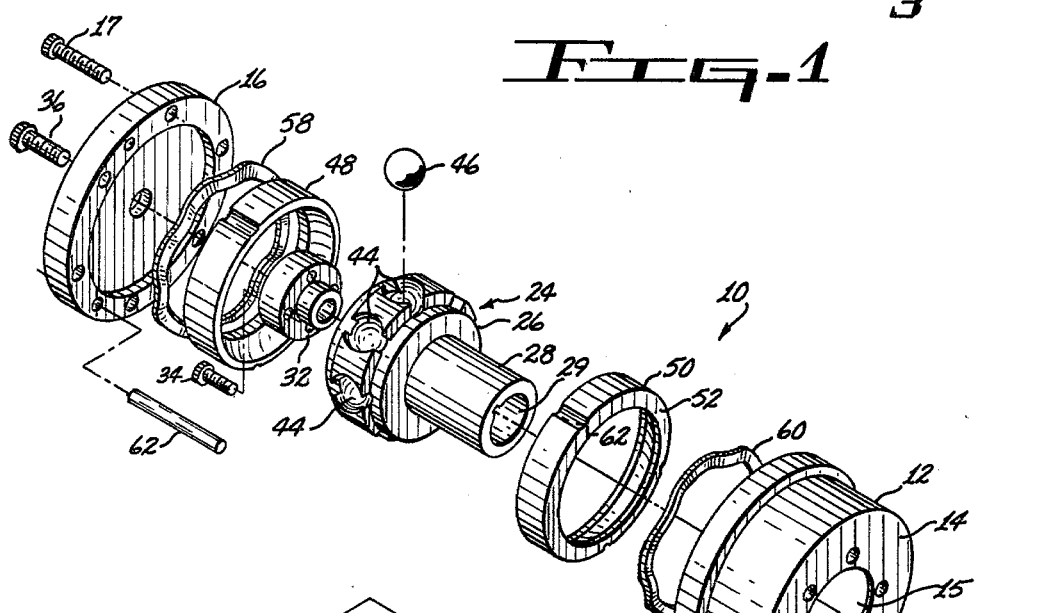
FIG. 2 is an exploded isometric view showing the various components of the centrifugally operated clutch and variable ratio torque multiplier of the present invention.
Figure 2:
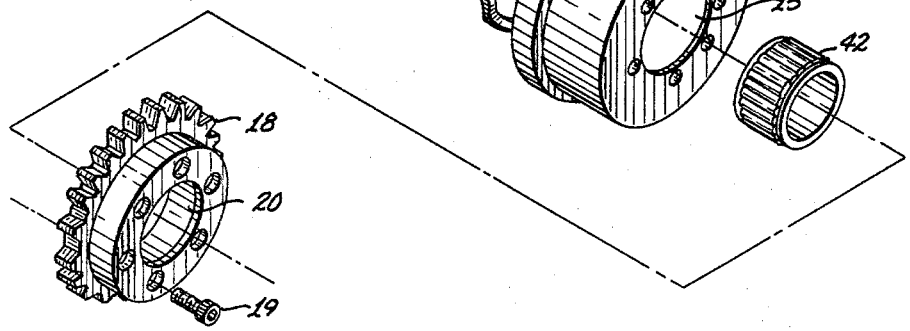
Figure 3:
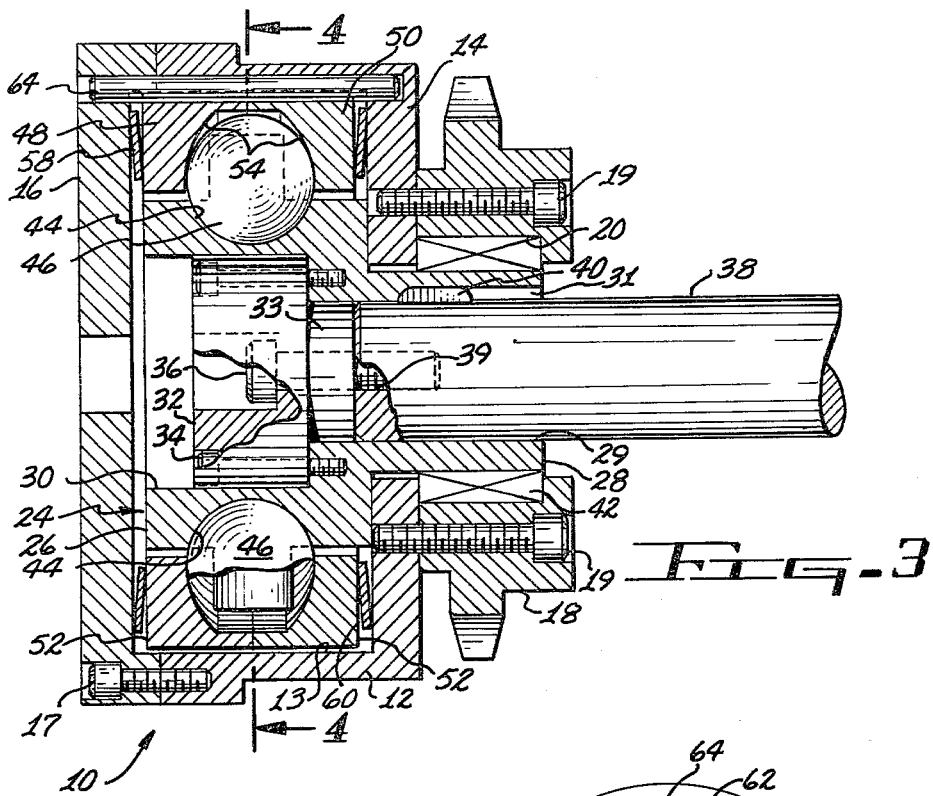
FIG. 3 is an enlarged sectional view taken on the line 3—3 of FIG. 1.

As seen best in FIGS. 2 and 3, a housing 12, which is preferably of cylindrical configuration, has a cylindrical chamber or bore 13 formed therein, and is provided with an integral end wall 14 having a central opening 15 formed therethrough, with the opposite end of the housing being closed by a demountable end plate 16 which is attached thereto such as by cap screws 17.

As will hereinafter be described in detail, a power output means 18 is affixed to the exterior surface of the end wall 14 of the housing 12 by suitable cap screws 19. The power output means 18 is shown in the form of a sprocket, with it being understood that the power output means may take the form of any other well known driving mechanism such as a belt pulley, gear (not shown), or the like. In any event, the power output means 18 is formed with an axial bore 20 having a reduced diameter lip on one end, and the power output means 18 is mounted on the housing 12 so that the bore 20 and the lip are coaxial with the opening 15 formed through the end wall 14 of the housing 12.

A ball carring disc, which is indicated in its entirety by the numeral 24 is provided with a cylindrically shaped body 26 from which a reduced diameter cylindrical shaft 28 axially extends. The disc 24 is formed with an axial bore 29 having a counterbore 30 formed in one end thereof and having a keyway 31 formed in its other end.

A plug 32 having a cylindrical reduced diameter shaft 33 is seated in the counterbore 30 and is affixed therein such as with cap screws 34 so that the reduced diameter shaft 33 thereof extends into the axial bore 29 of the disc 24. The plug 32 is formed with a counterbored axial bore for receiving a cap screw 36 as will hereinafter be described in detail.

The axial bore 29 of the disc 24 is adapted to receive a shaft 38 which is the output shaft of any suitable driving mechanism (not shown) such as an internal cumbustion engine. The shaft 28 forms the input shaft of the clutch and variable ratio torque multiplier 10 of the present invention and supplies rotary motion thereto. The input shaft 38 is provided with an axially disposed tapped hole 39 in its end for receiving the threaded shank of the cap screws 36, and carries a key 40 on its peripheral surface. When the input shaft 38 is inserted in the bore 29 of the disc 24 in a manner which places the key 40 in the keyway 31 and with the cap screw 36 in threaded engagement with the shaft's threaded hole 39, the disc 24 is fast with the input shaft 38 for rotation therewith. Therefore, the plug 32, cap screw 36 and key 40 provide means for affixing the ball carrying disc 24 to the input shaft 38.

The disc 24 is located in the cylindrical bore 13 of the housing 12 with the reduced diameter cylindrical shaft 28 thereof axially extending through the opening 15 in the end wall 14 of the housing 12 into the axial bore 20 of the power output means 18. The peripheral surface of the reduced diameter cylindrical shaft 28 carries a suitable bearing 42 which is mounted in the axial bore 20 of the power output means 18. In this manner, and as will hereinafter be described, the housing 12 with the power output means 18 carried thereon is journaled for rotation about the input shaft 38, and the disc 24 is journaled for rotation in the cylindrical chamber 13 of the housing 12.

A plurality of sockets 44 are formed in equally spaced increments in the peripheral surface of the body 26 of the disc 24, with each of the sockets 44 having a ball 46 positioned therein. The sockets 44 are configured so that they are each open on diametrically opposed sides thereof with the openings lying on a line which is parallel with respect to the rotational axis of the disc 24. In this manner, the opposite sides of the balls 46 will extend through the socket openings for reasons which will hereinafter become apparent as this description progresses.

An identical pair of ring-shaped races 48 and 50 are mounted in the cylindrical chamber 13 of the housing 12 so as to be concentric with the disc 24 and are arranged on opposite sides of the balls 46 carried by the disc. As seen best in FIGS. 4 and 5, the race 48 which is identical to the race 50, is formed with a flat surface 52 on one side thereof and has an endless axially and inwardly opening channel 54 of arcuate cross section formed on the opposite surface thereof. As will hereinafter be described, the channel 54 is formed with a diametrically opposed pair of smoothly contoured cam surfaces 56 or humps, which protrude into the channel.

The races 48 and 50 are positioned in the cylindrical bore of the housing 12 so that the channels 54 thereof face each other on opposite sides of the balls 46 and cooperate to form an annular groove in which the balls move.

The opposite facing flat surfaces 52 of the ring-shaped races 48 and 50 are adjacent the inner surface of the end plate 16 and the inner surface of the end wall 14 of the housing 12, respectively. A wave, or spring washer 58, is interposed between the end plate 16 and the race 48, and a similar wave washer 60 is interposed between the race 50 and the inner surface of the end wall 14. These wave washers 58 and 60 serve as means for biasing the races 48 and 50 toward each other.

Figure 4:
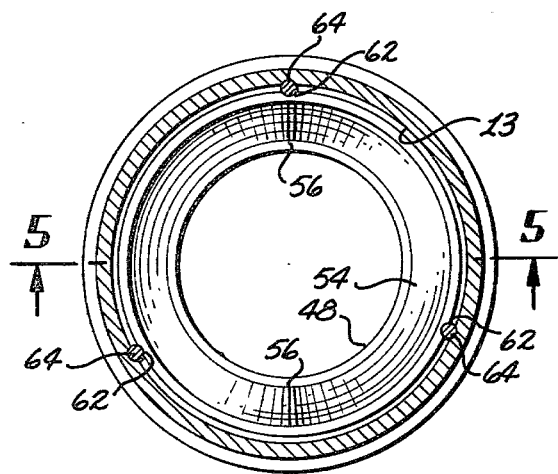
FIG. 4 is a sectional view taken along the line 4—4 of FIG. 3.
Figure 5:
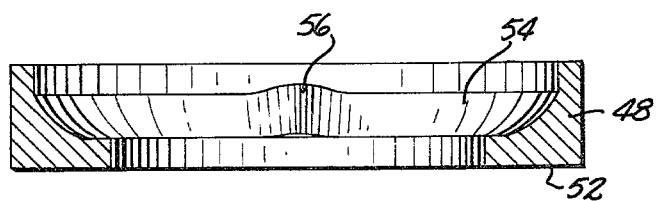
FIG. 5 is an enlarged sectional view taken along the line 5—5 of FIG. 4.

As seen best in FIG. 4, the race 48, and thus the identical race 50, is formed with a plurality of transverse grooves 62 formed in its peripheral surface, and those grooves receive anchor pins 64 which extend between the end plate 16 and the inner wall 14 of the housing 12 as shown in FIG. 3. The anchor pins 64 serve to lock the races 48 and 50 to the housing 12 so that the housing and races will rotate in unison with the races being free to move axially in the cylindrical chamber 13 of the housing.

From the above, it will be understood that the input shaft 38, ball carrying disc 24 and the radially movable balls 46 constitute a driving assembly, and the races 48, 50, and the housing 12 and the power output means 18 constitute a driven assembly.

OPERATION

Figure 6:
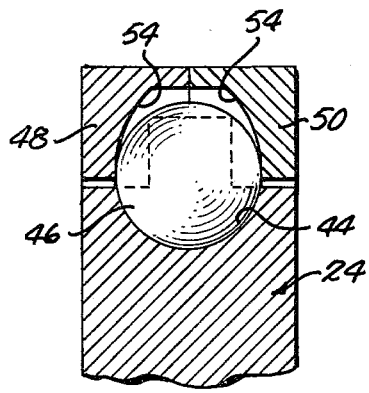
FIG. 6 is an enlarged fragmentary sectional view showing the operating relationship between the radially movable balls and the axially biased races when the input shaft is being rotatably driven at idle speed.

With the input shaft 38 at rest, the wave washers 58 and 60 spring-load the races 48 and 50 toward each other with such movement being limited by the races being in abutting engagement with each other as seen in FIGS. 3 and 6. In this state, the channels 54 of the races 48 and 50 bear lightly on the balls 46 and hold them within their respective sockets 44. At normal idle speed of the input shaft 38, the balls 46 will move radially a small amount due to centrifugal force, however, such radial movement is so small that no spreading forces are exerted on the races 48 and 50 and the balls roll freely in the annular groove formed by the races, and zero rotational output of the housing 12 and the power output means 18 results.

Figure 7:
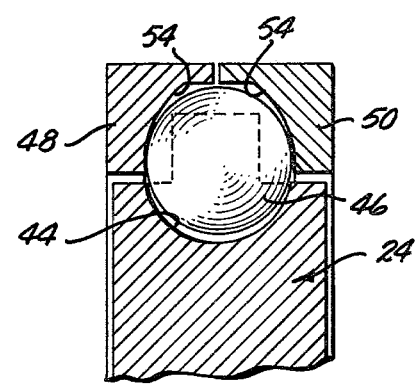
FIG. 7 is a view similar to FIG. 6 showing the operating relationship between the balls and the races at rotational speeds above idle RPM.
Figure 8:
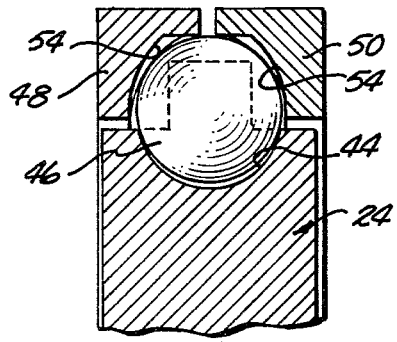
FIG. 8 is a view similar to FIG. 6 and showing the operating relationship of the balls and races when the balls are engaged in the cam surface restrictions formed in the races.

When the speed of the input shaft 38 is increased above normal idle RPM, the increase in centrifugal force will push the balls 46 forcefully into the annular groove and will spread the races 48 and 50 as shown in FIG. 7. Such action will increase the frictional engagement between the balls and the races and rotation of the housing 12 and power output means 18 results. At relatively low speeds above idle RPM of the shaft, the ratio of shaft rotation relative to housing rotation will be high, i.e., the housing rotates at a lower rate than the input shaft due to slippage of the balls in the annular groove. This ratio smoothly and gradually decreases as the RPM of the input shaft increases which radially moves the balls further into the annular groove. As seen in FIG. 8, as the balls are moved further into the annular groove, the contoured cam surfaces or humps 56 have an increasing effect on the passage of the balls in the groove. At relatively low input shaft RPM, the balls will move between relatively low profile portions of the aligned cam surfaces 56 located adjacent the opening of the annular groove, and as the balls move further into the groove, i.e., toward the bottom thereof, they will move between increasingly higher profile portions of those cam surfaces which result in decreasing slippage of the balls, and thus decreases the ratio of shaft rotation relative to housing rotation. In this manner, the housing 12 and the power output means 18 will smoothly and gradually speed up until a ratio of 1:1 between the driving assembly and the driven assembly is established.

Figure 9:
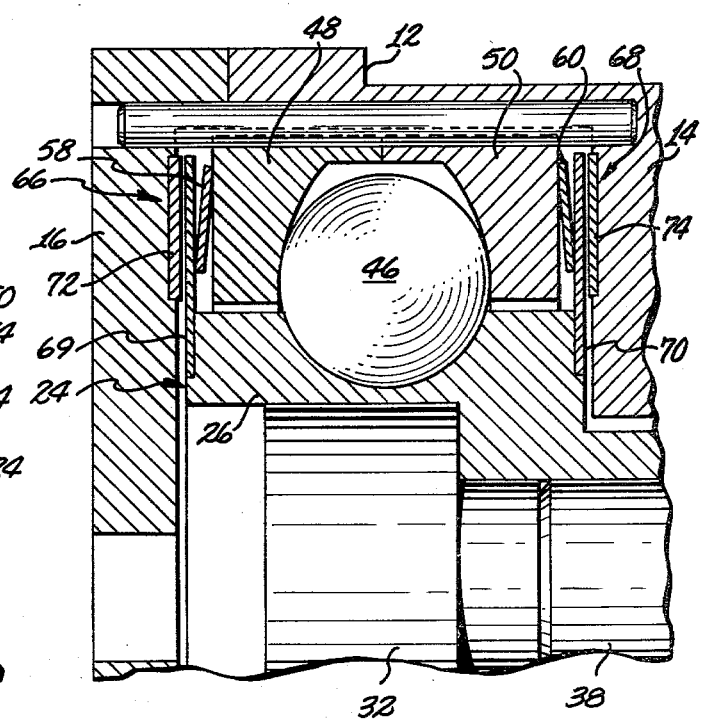
FIG. 9 is a fragmentary sectional view similar to FIG. 3 and showing a modification of the centrifugally operated clutch and variable ratio torque multiplier of the present invention.

The centrifugally operated clutch and variable ratio torque multiplier 10 as described above will operate quite well under most conditions of service usage. However, in instances where the driven assembly is subjected to intermittent high loads, such as in an automotive vehicle encountering a hill, there is a tendency for the driven assembly to drift backwards. To prevent such backward drifting and to produce a more positive action, the clutch and variable ratio torque multiplier of the present invention may be provided with friction clutch assemblies 66 and 68 as shown in the modified embodiment in FIG. 9. The body 26 of the ball carrying disc 24 is provided with a pair of ring-shaped clutch discs 69 and 70 which extend radially from the peripheral surface of the body 26. The clutch disc 69 is disposed on the body 26 so as to be adjacent the inwardly facing surface of the end plate 16, with the end plate being modified so as to fixedly carry a clutch disc 72 thereon. The clutch disc 70 is disposed so as to be adjacent the inwardly facing surface of the end wall 14 of the housing 12, with the end wall fixedly carrying a clutch disc 74 thereon.

When the radially movable balls 46 forcefully spread the races 48 and 50, as hereinbefore described, the wave washers 58 and 60 will bear against the clutch discs 69 and 70, respectively, with increased force and will move them into engagement with clutch discs 72 and 74. The frictional engagement of the friction clutches 66 and 68 will be rather light at low speeds of the input shaft 38 and will increase to a point where the driving assembly and driven assembly will be locked together at high shaft RPM.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A centrifugally operated clutch and variable ratio torque multiplier comprising;
   (a) a rotatably drivable input shaft;
   (b) a disc affixed for rotation with said input shaft and having a plurality of radial sockets formed in equally spaced increments in the periphery thereof, each of the sockets being open on diametrically opposed sides with the opening in a line parallel with the rotational axis of said disc;
   (c) a ball radially movable in each of the sockets of said disc;
   (d) a housing journaled for rotation about said input shaft and having a chamber in which said disc and said balls are located, said housing having opposed end walls;
   (e) power output means fast for rotation with said housing;
   (f) a pair of ring-shaped races axially movable in the chamber of said housing and fixed for rotation with said housing, said races concentric with said disc and on opposite sides of said balls, said races cooperatively defining an annular groove in which said balls are movable upon rotation of said input shaft; and
   (g) biasing means in the chamber of said housing for yieldingly urging said races toward each other so that said balls will roll freely in the annular groove of said races to cause zero rotational output of said housing when said input shaft is driven at low RPM with increased RPM of said input shaft causing said balls to move radially due to centrifugal force with such movement causing an increase in frictional engagement between said balls and said races to rotatably drive said housing.

2. A centrifugally operated clutch and variable ratio torque multiplier as claimed in claim 1 wherein said pair of races are each formed with at least one smoothly contoured cam surface which protrudes into the annular groove formed thereby to resist rolling movement of said balls therein.

3. A centrifugally operated clutch and variable ratio torque multiplier as claimed in claim 1 wherein said pair of races are each formed with a pair of diametrically opposed smoothly contoured cam surfaces which protrude into the annular groove formed by said pair of races, said pair of races disposed so that the cam surfaces of one of said races align in facing relationship with the cam surfaces of the other of said pair of races.

4. A centrifugally operated clutch and variable ratio torque multiplier as claimed in claim 3 wherein each of the cam surfaces of said pair of races are of relatively low profile adjacent the opening of the annular groove formed by said pair of races and smoothly increasing to a relatively high profile adjacent the bottom of the annular groove.

5. A centrifugally operated clutch and variable ratio torque multiplier as claimed in claim 1 wherein said biasing means comprising a pair of wave washers each in bearing engagement with said housing and each in bearing engagement with a different one of said pair of races.

6. A centrifugally operated clutch and variable ratio torque multiplier as claimed in claim 1 and further comprising means for demountably attaching said disc to said input shaft.

7. A centrifugally operated clutch and variable ratio torque multiplier as claimed in claim 6 wherein said means for demountably attaching said disc to said input comprises:
   (a) said disc having an axial bore formed therein with a keyway formed in one end and a counterbore formed in the other end;
   (b) said input shaft having for insertion into the keyway formed in the axial bore of said disc, said input shaft having a threaded axial bore formed in the end thereof which faces the counterbore formed in said disc;
   (c) a plug having a cylindrical body for fitting in the counter bore of said disc and having a reduced diameter portion extending axially therefrom toward the end of said input shaft, said plug having an axial bore formed therein; and
   (d) fastener means in the axial bore of said plug and in threaded engagement with the threaded bore of said input shaft.

8. A centrifugally operated clutch and variable ratio torque multiplier as claimed in claim 1 and further comprising at least one disc clutch means attached to said disc and to said housing and disposed axially adjacent one of said pair of races, said disc clutch means actuatable to frictionally lock said disc and said housing together upon axial spreading of said pair of races as a result of radial movement of said balls.

9. A centrifugally operated clutch and variable ratio torque multiplier as claimed in claim 8 wherein said disc clutch means comprises:
   (a) a first clutch disc extending radially from said disc so as to be in juxtaposed ralationship with one of said pair of races and with one of the end walls of walls of said housing; and
   (b) a second clutch disc mounted on the end wall of said housing in juxtaposed relationship with said first clutch disc.

* * * * *